UNITED STATES PATENT OFFICE.

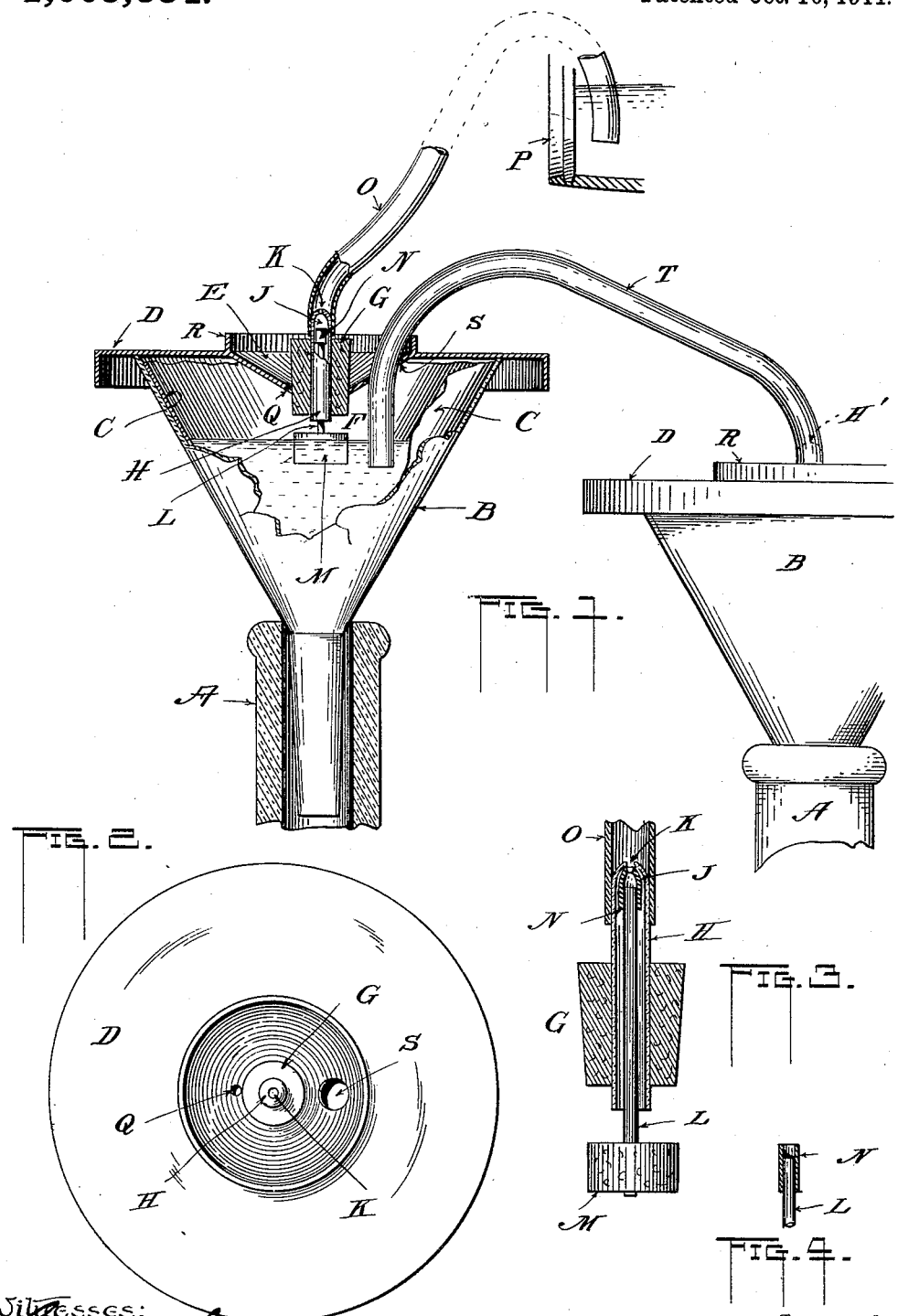

JACOB WEINKAUFF, JR., OF PEORIA, ILLINOIS.

VALVE.

1,005,384.   Specification of Letters Patent.   Patented Oct. 10, 1911.

Application filed April 5, 1909. Serial No. 487,969.

*To all whom it may concern:*

Be it known that I, JACOB WEINKAUFF, Jr., citizen of the United States, residing at Peoria, in the county of Peoria and State of Illinois, have invented certain new and useful Improvements in Valves; and I do hereby declare that the following is a full, clear, and exact description of the invention, which will enable others skilled in the art to which it appertains to make and use the same.

This invention relates to a new type of valve and pertains more particularly to a valve raised by a float for use with any form of apparatus desired where it is the wish to automatically start and stop the flow of a fluid.

An object of the invention lies in the provision of a float-valve that will prevent the flow of a fluid in an absolutely positive manner; it being peculiarly and particularly adapted for use in filtering apparatus, for instance, or in other forms of mechanism where an absolutely perfect bar to the flow of a fluid is required.

Another object lies in the provision of a valve of yielding compressible material that will close a fluid opening and absolutely prevent leakage.

Another object is to provide a valve of tubular form and of yielding material *i. e.* a material which by reason of its tubular form, will readily change its form to close a fluid passage.

Another object lies in providing a valve of a soft material such, for instance, as pure rubber, which will compress uniformly at every part so as to present a smooth and unwrinkled surface to the part with which it is associated so that there will be absolutely no leakage.

In order to show the application of the device it has been illustrated in connection with a filtering apparatus in the appended drawing in which:—

Figure 1 is an elevation of two filtering devices one of them being in part section and in connection with which my valve is shown. Fig. 2 is a plan of one of the devices showing my said valve. Fig. 3 is a sectional elevation of the valve and parts. Fig. 4 is a sectional elevation of part of the valve shown in Fig. 3 but on a slightly smaller scale.

A represents the neck of a bottle or some other form of receptacle to receive a filtrate and B is a funnel inserted therein through which to filter a fluid. The funnel is provided with any suitable filtering material such, for instance, as paper represented at C and its top is covered by any suitable lid or cover D which will prevent evaporation and which will prevent entrance of foreign matter into the fluid being filtered all of which, however, being immaterial to my invention. Said cover is provided with a suitabe basin which may be conical in form, as at E, having a hole F in its bottom for receiving a plug G preferably a cork; this also being immaterial to the invention. Through this plug or cork extends a tube H of block tin, glass or such other material as will resist the corroding action of acids, and as shown in Fig. 3 the upper end of the said tube is constricted to form a conical dome J provided with an aperture K. Within the tube is a stem L, also of block tin, glass, or the like, whose lower end is carried by any suitable float M, the upper end of said stem being provided with a small piece of yielding compressible material N such, for instance, as rubber preferably made tubular in form and open at its upper end since it is more quickly and properly compressed by a slight pressure. The stem L may be adjusted in the float M so that the valve N thus constituted will close the opening K in the dome J when the fluid in the funnel has reached any desired or predetermined level.

O is a tube for drawing fluid from a receptacle at P to be filtered; one end of the tubing being slipped over the upper end of the tube H as shown.

The operation of the parts so arranged is as follows:—The fluid as it enters the tube H through the aperture K is discharged into the funnel B by passing around the valve, being then filtered into the receptacle A. The fluid in gradually rising in the funnel raises the float M and as the level of said fluid approaches a predetermined height the valve N is gradually carried up into the dome J finally tightly and positively closing its passage. This results in stopping the flow of fluid into the funnel until by filtering through into the receptacle A the level falls sufficiently to allow the said valve N to partially or entirely free the aperture K to permit the fluid to flow. The device is thus automatic in its action since the inflow of fluid is controlled entirely by the rate of flow into the receptacle A. The dome J by being conical insures that the valve N in crowding up into it will form a perfectly fluid tight joint but as the valve is somewhat smaller in diameter than the inside diameter of the tube H the fluid can readily flow down around it when the aperture K is open. The taper of the dome is abrupt rather than otherwise so that the valve cannot wedge into it but will readily free itself as the fluid level lowers. Since the form of the dome-cavity is conical and since, also, the material of which the valve is made is very pliable and compressible the slightest pressure against the former due to the float causes the valve to fit snugly into said cavity by being compressed to the same extent from all directions inwardly as results when using pure rubber, for instance, and in being tubular in form and open at its end so that the edge of the material engages the walls of the dome a minimum of pressure is required to close the opening K against passage of fluid. And, again, since by reason of the abruptness of the cavity the valve will, in effect, be partially forced free of it due to the expanding action of the rubber as the float lowers.

The material used is found to be of importance in that if not of the proper pliableness and not capable of properly compressing under slight pressure the desired result cannot be obtained. Rubber, for instance, as ordinarily used, which includes in its "make up" a large percentage of foreign matter, such as sulfur, is too hard and in use under pressure becomes crimped around its edge when pushed into the gradually narrowing dome and allows leakage past it through each of the channels between the crimps. A softer material however, such as the pure rubber referred to will compress evenly and make an absolutely tight closure.

I do not confine myself to the exact arrangement described and shown since changes may be made that will still lie within the making of the invention and the claims.

Having thus described my invention, I claim:—

1. In a valve, a tubular member having an apertured otherwise closed end and a member provided with a valve of tubular resilient compressible material having an open end adapted to close the aperture in the tubular member.

2. A valve comprising a conical member provided with an aperture, a tubular member of yielding material having an open end and arranged to enter the said conical member and adapted by pressure thereon to change in form to close the aperture, and means in control of and to move said yielding member.

3. A valve comprising a tubular conical member provided with an aperture in its end, a hollow member of a yielding compressible material having an open end and adapted to engage the inner walls of said conical member, and means to force it against the same to close the aperture.

4. In a valve, a tube constructed at its end to form a hollow cone and having an aperture therein at the apex of said cone, a float, and a tubular yielding member having an open end and adapted to be carried into the tube by said float against the inner wall of the cone to close said aperture.

5. A valve comprising a conical member provided with an aperture, a tubular member of a yielding material having an open end adapted to engage said conical member, and by pressure thereon to change in form to close the aperture, and means in control of and to move said yielding member.

6. A valve comprising a conical member provided with an aperture, a tubular member of a yielding material provided with an open end adapted to engage said conical member and by pressure thereon to change in form to close the aperture, and a float in control of and to move said yielding member.

7. A valve comprising a tube having an open end and constricted at that end to form a conical seat, an open tubular resilient compressible member, and means to move the open portion of said member into said conical seat and against its walls.

8. The combination of a member provided with a bore and open at one end and having its walls constricted at that end to form a conical seat, and a tubular resilient compressible member having an open end adapted at that end to move against the walls of and into the seat of said member.

In testimony whereof I affix my signature, in presence of two witnesses.

JACOB WEINKAUFF, Jr.

Witnesses:
L. M. THURLOW,
A. KEITHLEY.

---

Copies of this patent may be obtained for five cents each, by addressing the "Commissioner of Patents, Washington, D. C."